Feb. 17, 1931.     V. G. APPLE     1,792,526

DYNAMO ELECTRIC MACHINE

Filed June 14, 1928

INVENTOR.
Vincent G. Apple

Patented Feb. 17, 1931

1,792,526

UNITED STATES PATENT OFFICE

VINCENT G. APPLE, OF DAYTON, OHIO

DYNAMO-ELECTRIC MACHINE

Application filed June 14, 1928. Serial No. 285,367.

My invention relates particularly to improvements in the form and arrangement of the frame of a dynamo electric machine, and an object of my invention is to so construct this portion of the machine that other portions may be more readily and more securely attached thereto or more effecetively mounted thereon for communication therewith.

Other objects will become apparent to those skilled in the art as the invention is described in detail and reference is made to the drawings wherein—

Similar numerals refer to similar parts thruout the several views.

Figure 1:
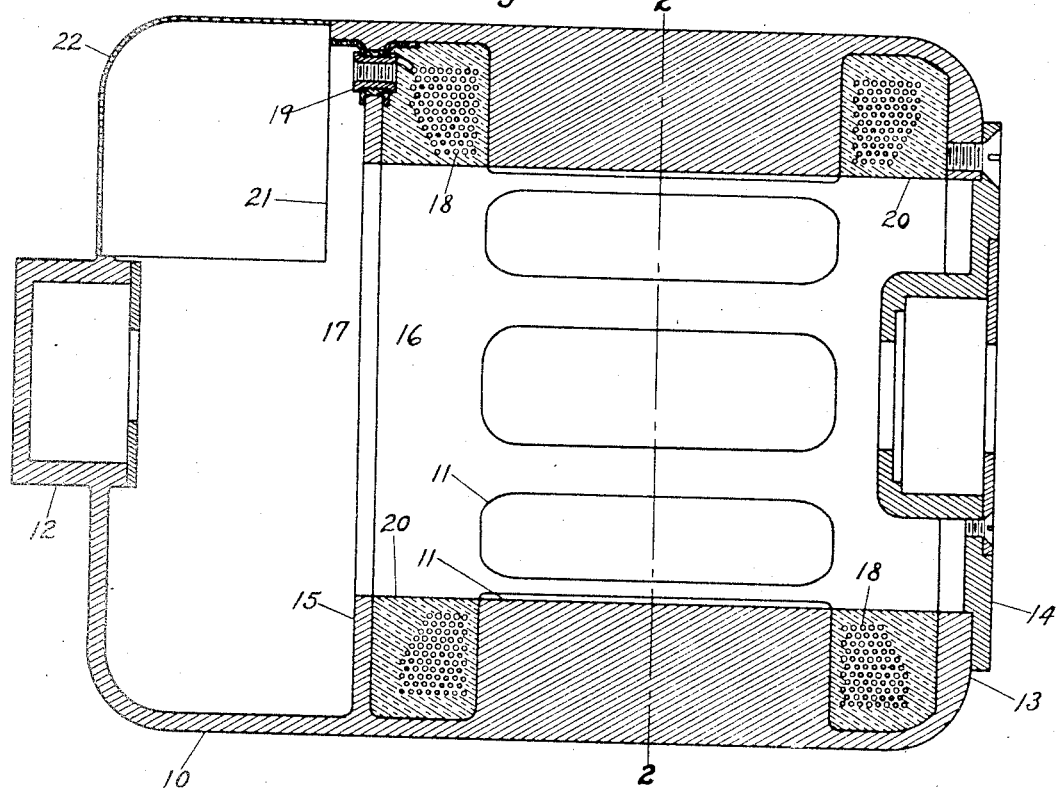
Fig. 1 is a longitudinal vertical cross section thru the dynamo.
Figure 2:
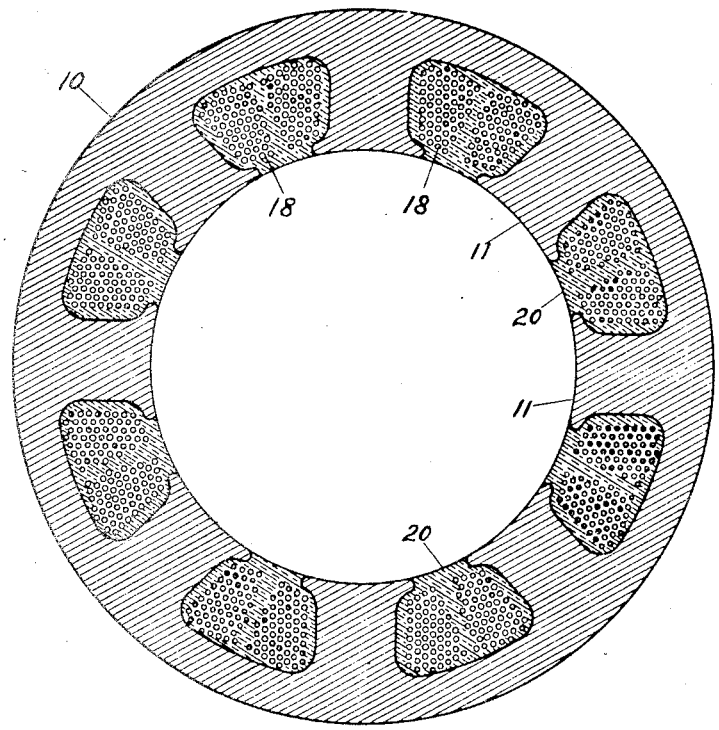
Fig. 2 is a cross section taken on line 2—2 of Fig. 1.

Referring to the drawings a substantially closed frame 10 carries a series of poles, 11, 11 etc., one end being closed in to form a hub 12, and the other end being partially closed in to form flange 13 which supports bearing head 14.

A partition 15 extends inwardly from frame 10 dividing said frame into two compartments 16 and 17.

Flange 13, poles 11 and partition 15 are bored to a diameter slightly larger than the armature that is to run within said poles, said armature to be supported at one end by a bearing within hub 12 and at the other end by a bearing within bearing head 14.

Coils 18 wound about poles 11 have as their terminals one or more contacts 19 which are securely fastened to but electrically insulated from partition 15, or one or more coil ends of one polarity may be joined to frame 10 when it is desired to complete the circuit thru said frame.

After the coils are in place and connected a cylindrical plug may be inserted in the frame, said plug to closely fit and extend thru flange 13, poles 11 and partition 15. Fluid insulating material 20 is then poured or pumped into the space left by coils 16 and hardened or allowed to harden by heat or other means, after which the plug is removed and compartment 16 comprising the field element is complete leaving compartment 17 to contain the brush rigging.

Brush holders may be mounted directly on partition 15 or they may be mounted on a ring adjustably secured to partition 15, or in any other manner desired, the improvement residing not so much in the manner of mounting the brush rigging as in the contour of the frame which being divided into two compartments by partition 15 is especially adapted, by the insertion of a simple plug, to confine the insulating material 20 which protects and holds the coils in place, the partition serving at the same time as a means of support for rigid winding terminals without the necessity for the flexible leads or loose wires which usually proceed from the ends of a field winding for connection to other parts. A portion of frame 10 may be cut away as at 21 or in any manner to give convenient access to the brushes and a cover 22 may be supplied for the opening thus formed.

While I have herein shown and described as one embodiment of my invention a frame of cylindrical contour frames of other contour may be used if desired, and the several portions of the frame may be integral as shown or made up of a plurality of separate parts joined together.

Having described my invention I aim to more clearly define the scope thereof in the following, wherein I claim—

1. In a dynamo electric machine, a substantially closed shell, field poles extending inwardly from said shell, bearings adapted to support an armature within said shell, a partition wall extending inwardly from said shell dividing the space within into a field compartment and a brush compartment and carrying an insulated terminal thereon, a field winding about said poles and connected to said terminal and insulating material binding said field winding in place and filling all voids in said field compartment.

2. In a dynamo electric machine, a substantially closed shell, field poles extending inwardly from said shell, bearings adapted to support an armature within said shell, a partition wall adapted to carry a brush rigging extending inwardly from said shell dividing the space within into a field compartment and a brush compartment and carrying an insulated terminal thereon, a field winding about said poles and connected to said terminal and insulating material binding said field windings in place and filling all voids in said field compartment.

3. In a dynamo electric machine, a substantially closed shell, field poles extending inwardly from said shell, one end of said shell being substantially closed and having a hub to support a bearing for one end of an armature, the other end being partially closed to permit entrance of the armature and to support a cover containing a bearing for the other end of said armature a partition wall extending inwardly from said shell dividing the space within into a field compartment and a brush compartment and carrying an insulated terminal thereon, a field winding about said poles and connected to said terminal and insulating material binding said field winding in place and filling all voids in said field compartment.

4. A method of making a part of a dynamo electric machine, which consists of providing a substantially closed shell having field poles extending inwardly therefrom, supports for armature bearings connected therewith and a partition wall extending inwardly therefrom dividing the space within into a field compartment and a brush compartment, boring the partition, the poles and one end of said shell, placing a field winding over said poles and connecting said winding to an insulated terminal supported on said partition, inserting a cylindrical plug into said bored portions, forcing in a fluid insulating material around the coils to hold them in place and fill all voids in the field compartment, solidifying the insulating material and removing said plug.

5. In a dynamo electric machine, an inseparable field structure comprising, a substantially closed shell, field poles extending inwardly from said shell, a seat for a bearing in one end of said shell, a seat for a bearing cap in the other end of said shell, a partition intermediate said ends extending inwardly from said shell, a mass of molded insulation filling the space within the shell from the bore of the poles outwardly and between said partition and said bearing cap seat, and coils surrounding said poles and imbedded in said molded insulation mass.

6. In a dynamo electric machine, a unitary field structure comprising, a substantially closed shell, field poles extending inwardly from said shell, a seat for an armature shaft bearing in one end of said shell, a seat for an armature shaft bearing cap at the other end of said shell, a partition intermediate said ends extending inwardly from said shell, a metal terminal extending through the wall of said partition, a winding surrounding said poles and connected to said terminal, and a mass of insulation molded in situ into all of the remaining space in said shell from the bore of said poles outwardly and from said partition to said bearing cap seat to surround said winding and the joint connecting said winding to said terminal.

In testimony whereof I hereunto set my hand.

VINCENT G. APPLE.